United States Patent
Staudenmaier et al.

(10) Patent No.: US 12,272,128 B2
(45) Date of Patent: Apr. 8, 2025

(54) METHOD AND SYSTEM FOR PROCESSING IMAGE INFORMATION WITH AN ARTIFICIAL NEURAL NETWORK

(71) Applicant: Conti Temic microelectronic GmbH, Nuremberg (DE)

(72) Inventors: Armin Staudenmaier, Hörbranz (DE); Karl Matthias Nacken, Bad Schachen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 535 days.

(21) Appl. No.: 17/650,978

(22) Filed: Feb. 14, 2022

(65) Prior Publication Data
US 2022/0262107 A1   Aug. 18, 2022

(30) Foreign Application Priority Data
Feb. 17, 2021  (DE) ..................... 10 2021 201 497.6

(51) Int. Cl.
*G06V 10/82* (2022.01)
*G06N 3/048* (2023.01)
*G06V 10/764* (2022.01)
*G06V 10/766* (2022.01)
*G06V 10/77* (2022.01)
*G06V 20/58* (2022.01)

(52) U.S. Cl.
CPC ............. *G06V 10/82* (2022.01); *G06N 3/048* (2023.01); *G06V 10/764* (2022.01); *G06V 10/7715* (2022.01)

(58) Field of Classification Search
CPC .. G06V 10/82; G06V 10/764; G06V 10/7715; G06V 10/467; G06V 10/766; G06V 20/58; G06V 20/70; G06N 3/048; G06N 3/045; G06N 3/08; G06N 3/044; H04N 19/13; H04N 19/85
See application file for complete search history.

(56) References Cited

U.S. PATENT DOCUMENTS

| 11,250,595 | B2 * | 2/2022 | Covell | G06N 3/08 |
| 2017/0064336 | A1 * | 3/2017 | Zhang | H04N 19/124 |
| 2021/0174513 | A1 * | 6/2021 | Chidlovskii | G06N 3/08 |

(Continued)

OTHER PUBLICATIONS

Huiqun Deng, et al., "Applying Error-Correcting Output Coding to Enhance Convolutional Neural Network for Target Detection and Pattern Recognition", 2010 International Conference on Pattern Recognition, pp. 4291-4294.

(Continued)

*Primary Examiner* — Nancy Bitar
*Assistant Examiner* — Dustin Bilodeau

(57) ABSTRACT

A method for processing image information of an imaging sensor of a vehicle in an artificial neural network ("ANN") is disclosed. The ANN includes at least one encoder and one decoder. The ANN solves a classification task with a plurality of classes and/or a regression task, in which numerical output information quantized according to a plurality of quantization steps is provided. The ANN outputs multiple feature maps at the output interface, wherein allocations of image regions of the image information to classes or numerical output information quantized regarding the image information is/are output by the feature maps in an encoded manner.

20 Claims, 2 Drawing Sheets

(56) References Cited

U.S. PATENT DOCUMENTS

2022/0159207 A1* 5/2022 Dell' Anna .......... H04N 19/167
2022/0189116 A1* 6/2022 Bloesch .................... G06T 7/55
2022/0201316 A1* 6/2022 Coelho ................. H04N 19/19

OTHER PUBLICATIONS

Mahdyar Ravanbakhsh, et al., "CNN-Aware Binary Map for General Semantic Segmentation", ICIP, pp. 1923-1927, 2016.
Zeynep Akata, et al., "Label-Embedding for Image Classification", Cornell University, arXiv:1503.08677v2 [cs.CV]. Oct. 1, 2015.
Pau Rodriguez, et al., "Beyond One-hot Encoding: lower dimensional target embedding", arXiv:1906.10805v1 [cs.CV] Jun. 28, 2018.
Erin L Allwein, et al., "Reducing Multiclass to Binary: A Unifying Approach for Margin Classifiers", Journal of Machine Learning Research 1 (2000) 113-141.
Yuanzhouhan Cao, et al., "Estimating Depth from Monocular Images as Classification Using Deep Fully Convolutional Residual Networks", arXiv:1605.02305v3 [cs.CV] Aug. 11, 2017.
Thomas G Dietterich, et al., "Solving Multiclass Learning Problems via Error-Correcting Output Codes", Journal of Artificial Intelligence Research 2 (1995) 263-286.
Chao Liu, et al., "Neural RGB ->D Sensing: Depth and Uncertainty from a Video Camera", arXiv:1901.02571v1 [cs.CV] Jan. 9, 2019.

* cited by examiner

METHOD AND SYSTEM FOR PROCESSING IMAGE INFORMATION WITH AN ARTIFICIAL NEURAL NETWORK

CROSS-REFERENCE TO RELATED APPLICATIONS

This application claims priority to German patent application No. 10 2021 201 497.6, filed Feb. 17, 2021, which is hereby incorporated by reference.

TECHNICAL FIELD

The technical field relates to a method and a system for processing image information which is provided by an imaging sensor of a vehicle with an artificial neural network as well as a vehicle having such a system.

BACKGROUND

The complexity of neural networks and the computational cost in neural networks increase proportionally to the size of the input or output representations. In other words, the computational cost becomes all the greater, the greater the image information to be processed is. In so-called convolutional neural networks (CNN), the output information is provided in so-called feature maps. The number of the output feature maps has a significant influence on the computational cost in convolutional neural networks.

In classification applications, for example semantic segmentation, so-called one-hot encoding is at present mostly used for the output representations. During this, a vector or a code word having a length which is equal to the number of classes to be distinguished is used for outputting the class information for each image region (for example individual pixels, groups of pixels or the entire image) in each case. Neglecting the estimation inaccuracies of the neural network, the code word has first binary information, for example 1, at a single digit, otherwise merely second binary information, i.e., for example 0. The number of feature maps and therefore the length of the code word or of the vector consequently increase linearly with the number of classes to be distinguished.

In particular, in the case of pixel-based methods such as semantic segmentation, in which a classification is allocated to each pixel of the input image information, and therefore the size of the feature maps is in each case the size of the image information to be processed, high computational and storage capacities are required, which is in particular problematic in the case of low computational and storage capacities, as is the case in vehicle-mounted computing units.

In addition, it is already known that a regression problem can be solved in neural networks by transforming it into a classification problem and solving said classification problem. If a regression problem is solved by being transformed into a classification problem, which uses so-called one-hot encoding, the number of feature maps is equal to the number of quantization steps, based on which the continual output variable of the regression problem is quantized. Here as well, the computational cost and storage outlay therefore increase linearly with the number of quantization steps, which influences the accuracy of the output variable of the regression problem.

As such, it is desirable to present a method for processing image information in an artificial neural network which makes it possible to reduce the computational and storage requirements while retaining a high estimation accuracy.

SUMMARY

According to a first aspect, the disclosure presents a method for processing image information of an imaging sensor of a vehicle in an artificial neural network. The neural network includes at least one encoder and one decoder. The neural network may be a convolutional neural network (CNN). The artificial neural network is configured to solve a classification task with a plurality of classes and/or a regression task, in which numerical output information quantized according to a plurality of quantization steps is provided. The artificial neural network outputs multiple feature maps at an output interface. Allocations of image regions of the image information to classes or numerical output information quantized regarding the image information is/are output in an encoded manner by the feature maps, and indeed in such a way that the respective inputs in corresponding matrix fields of the feature maps together produce a code word. In other words, a code word or a vector which reproduces a class or a quantization step (for example, tenth quantization step of one hundred quantization steps) in an encoded form is produced from the plurality of values which are entered in fields corresponding to one another (for example in each case the same row and same column) in the feature maps. An "image region" can for example be an individual pixel, a group of multiple pixels or the entire image information or the entire image. An information compression is achieved by the encoding, and indeed in such a way that the output number of feature maps is smaller than the number of classes or the number of quantization steps.

The technical advantage of the suggested method is that thanks to the encoding of the output information the number of feature maps can be significantly reduced, so that the computational and storage requirements of the neural network are considerably reduced.

According to an exemplary embodiment, the inputs of the feature maps which form the code word are distorted by estimation errors so that a quasi-binary code word is produced, i.e., a code word which has not only zeroes and ones as values at the individual code word digits, but in particular decimal numbers between 0 and 1. They are converted by a decision function into a binary-coded code word.

According to an exemplary embodiment, the following decision function is used:

$$\hat{p} = \begin{cases} 1; \text{if } p_i \geq t \\ 0; \text{else} \end{cases}$$

$\hat{p}$ is a binary number which forms one digit of the binary code word, $p_i$ is the respective value of the input in the feature map, which corresponds to the digit of the binary code word (i.e., the value distorted by estimation errors), and t is the decision threshold. As a result, the values of the digits of the quasi-binary code word can in each case be converted into values of the binary code word.

According to an exemplary embodiment, the binary-coded code word is decoded into class information or a rational number. The class information is an indicator of the class to which the respective image region can be allocated according to the predefined classification, or outputs information in the form of a rational number which relates to the image region, for example depth information regarding said image region. Depending on the application, an "image region" can for example be an individual pixel, a group of multiple pixels or the entire image information or the entire image.

According to an exemplary embodiment, the classification task is a semantic segmentation task and/or the regression task is a task for monocular depth estimation. As a result, the method can preferably be used in driving assistance systems of vehicles, which make it possible to control vehicles in an at least partially automated manner based on classified objects and surroundings information provided with depth information.

According to an exemplary embodiment, the artificial neural network is a multi-task network, i.e., the artificial neural network has an encoder in the form of a multi-task encoder which provides computing operations for a classification task and a regression task and/or the artificial neural network has a decoder in the form of a multi-task decoder which provides computing operations for a classification task and a regression task. Thanks to the suggested method, it is possible to create simplified and harmonized multi-task encoders or multi-task decoders which solve both a classification task and a regression task, since the regression task can be advantageously converted into a classification task and, despite a high number of quantization steps, results in a relatively low output representation (i.e., a low number of feature maps). The neural network can be trained with a single error function.

According to an exemplary embodiment, the artificial neural network is trained based on an error function, which determines the total distance of the values of the digits of the code word estimated by the neural network, in particular of the quasi-binary code word, from the respective values of the corresponding digits of the nominal code word of the training data. In other words, ground-truth training data are therefore provided, which contain the nominal code word which should result as output information of the neural network without estimation errors. The estimation result of the neural network to be trained supplies a quasi-binary code word regarding image information of said training data. The error function makes it possible to establish the total distance which exists between the respective corresponding digits of the estimated quasi-binary code word and the nominal code word.

According to an exemplary embodiment, the artificial neural network is trained based on a binary cross entropy error function or a focal loss error function. Such error functions establish the error based on two functional parts and therefore make it possible to incorporate both the distance of a value of one digit of the estimated code word of the digital value "1" and the distance of a value of one digit of the estimated code word of the digital value "0" into the establishment of the error.

A loss error function is advantageously used, which, depending on the respective task, makes possible a weighting depending on the bit significance. For example, a binary cross entropy error function can be used according to the following formula:

$$E = \frac{1}{\log_2(N)} \sum_{i=0}^{\log_2(N)-1} w_i(-y_i \cdot \log(\hat{p}_i) - (1-y_i) \cdot \log(1-\hat{p}_i))$$

wherein the weighting factor $w_i$ is selected as follows:

$$w_i = \begin{cases} 1, \text{classification} \\ \frac{1}{2^{\log_2(N)-1-i}}, \text{regression} \end{cases}$$

wherein E indicates the classification error, N is the number of classes, $\hat{p}_i$ is the respective estimated output value, $w_i$ is a weighting factor and $y_i$ is the nominal value according to the training data. i forms the control variable, wherein i=0 designates the least significant bit.

The weighting is advantageous in the case of regression, no weighting should be carried out during the classification (wi=1).

According to an exemplary embodiment, the values of the digits of the estimated code word are adapted by means of a limiting function prior to the application of the error function. The limiting function is preferably a sigmoid function. As a result, the values of the estimated code word can be limited to values between 0 and 1.

According to an exemplary embodiment, prior to the application of an error function, the code word is decoded into a rational number and the error function determines the distance of the decoded rational number from the nominal value according to the training data. As a result, an improved error estimation can in particular be effected in the case of regression problems.

According to a further aspect, the disclosure presents a system for processing image information of an imaging sensor of a vehicle in an artificial neural network which includes at least one encoder and one decoder. The artificial neural network is designed to solve a classification task with a plurality of classes and/or a regression task, in which numerical output information quantized according to a plurality of quantization steps is provided. The artificial neural network is further configured to output multiple feature maps at the output interface, wherein allocations of image regions of the image information to classes or numerical output information quantized regarding the image information is/are output by the feature maps in an encoded manner, and indeed in such a way that the respective inputs in corresponding matrix fields of the feature maps together produce a code word, and wherein an information compression is achieved by the encoding, and indeed in such a way that the output number of feature maps is smaller than the number of classes or the number of quantization steps.

According to an exemplary embodiment of the system, the imaging sensor is a camera, a radar or a lidar sensor of a vehicle. As a result, image information which is provided by a vehicle-mounted sensor can be processed by the system, and the information which is provided by the neural network can be used for the provision of driving assistance functions.

According to an exemplary embodiment of the system, the artificial neural network is a multi-task network, i.e., the artificial neural network has an encoder in the form of a multi-task encoder which provides computing operations for a classification task and a regression task and/or the artificial neural network has a decoder in the form of a multi-task decoder which provides computing operations for a classification task and a regression task. The classification task is a semantic segmentation task and the regression task is a task for monocular depth estimation. This has the advantage that system resources can be saved by combining the classification task and the regression task in a single multi-task network.

According to another aspect, the disclosure provides a vehicle comprising an aforementioned system according to one of the exemplary embodiments.

The term "quasi-binary code word" within the meaning of the disclosure is understood to be a code word which, based on estimation inaccuracies of the neural network, not only contains values between 0 and 1, but also decimal numbers which deviate from 0 or 1. The quasi-binary code word can, however, be converted by suitable functions, for example a decision function, into a binary code word.

The term "feature map" within the meaning of the present disclosure is understood to be a data structure which is output at an output interface of a neural network. A feature map is, for example, a multidimensional, for example matrix-type, data structure which contains multiple values, in particular numerical values.

The expressions "approximately", "substantially" or "roughly" mean deviations from the exact value in each case by +/−10%, preferably by +/−5% and/or deviations in the form of changes which are insignificant to the function.

Further developments, advantages and possible applications of the invention are set out by the following description of exemplary embodiments and by the figures. All of the features described and/or pictured per se or in any combination are fundamentally the subject-matter of the invention, independently of their combination in the claims or references back thereto. The content of the claims is also made an integral part of the description.

BRIEF DESCRIPTION OF THE DRAWINGS

The disclosure is explained in greater detail below on the basis of the figures with reference to exemplary embodiments, wherein.

DETAILED DESCRIPTION

Figure 1:
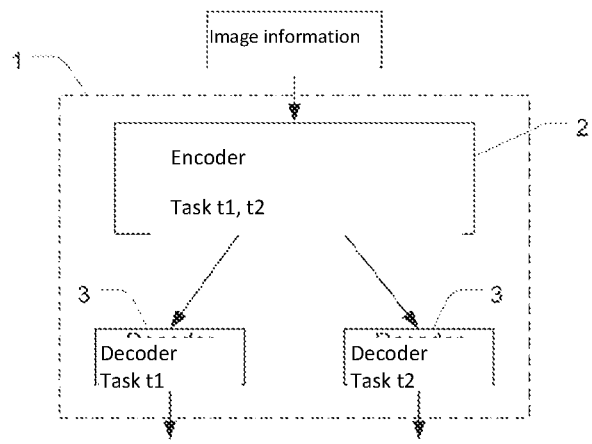
FIG. 1 shows by way of example a schematic representation of a neural multi-task network for processing image information.

FIG. 1 shows by way of example a schematic block diagram of an artificial neural network 1 which is configured to establish or extract information from image information. Image information within the meaning of the present disclosure is understood to be the multi-dimensional data containing the surroundings information. This can in particular be information from imaging sensors such as, for example a camera, a radar sensor, a lidar sensor or similar. The artificial neural network 1 can in particular be a so-called convolutional neural network (CNN).

The artificial neural network 1 has at least one encoder 2 and at least one decoder 3. The neural network 1 shown in FIG. 1 is a so-called multi-task network which can simultaneously solve multiple image processing tasks. In the shown exemplary embodiment, these are the tasks t1 and t2. For example, the first task t1 is a classification task, i.e., the output information of the neural network is class information, and the second task is a regression task, i.e., the output information of the neural network regarding the second task is a continual output variable, for example in the form of rational numbers.

During a classification task, individual pixels of the image information or image regions comprising multiple pixels, for example, are allocated to specific classes. Such a classification task is for example semantic segmentation.

A regression task can for example be the provision of depth estimation information regarding the image information. For example, depth estimation information can be provided for each pixel of the image information in order to obtain depth information regarding the image information.

The encoder 2 can be a so-called shared encoder, i.e., it can take on coding tasks for multiple tasks. The neural network can have multiple different decoders 3, which are specially tailored to the respective task, for the different tasks.

However, it is understood that deviating therefrom or additionally a so-called shared decoder can also be provided, which simultaneously takes on the decoding for multiple tasks. In addition, the compression method described in greater detail below can also be used in neural networks, which merely solve a single image processing task.

Figure 2:
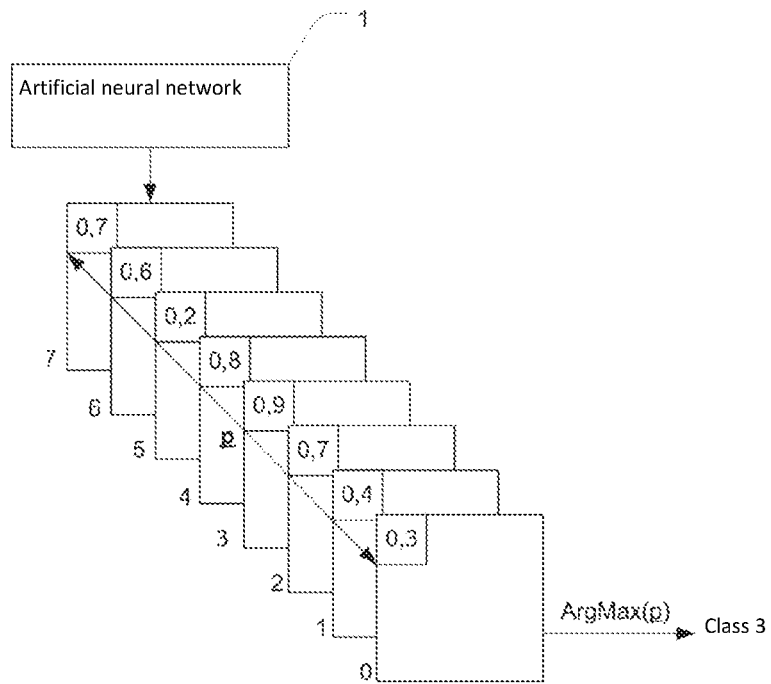
FIG. 2 shows by way of example a schematic representation of the output information of the neural network in the form of multiple feature maps involving the application of a one-hot encoding method.

An artificial neural network 1, which outputs class information as output information which are encoded in accordance with so-called one-hot encoding, is shown by way of example and schematically in FIG. 2. Multiple so-called feature maps are output as output information at an output interface of the neural network 1.

A feature map is for example a multi-dimensional, for example matrix-type, data structure which contains multiple values. A numerical value refers to a specific region of the image information which is transmitted as input information to the neural network 1. A region can, for example, be an individual pixel or a group of multiple pixels.

The regions provided with the numerical values in FIG. 2 constantly refer to the same image region, for example a defined pixel of the image information. The numerical values form a code word in the form of a vector p.

In the shown exemplary embodiment, the neural network 1 performs a classification task, for example semantic segmentation, i.e., the task of the neural network 1 is to estimate to which class the image region, to which the code word or the values of the vector p refer(s), is to be allocated.

The code word in the form of the vector p is encoded according to the one-hot encoding method. Each feature map is allocated to a specific class. Said allocation is defined by the numbers 0 to 7. The encoding is selected in such a way that the image region, to which the code word refers, is to be allocated to that class, the feature map of which has the highest numerical value. In other words, the largest numerical value in the code word or the vector representing the code word is accordingly to be determined and the digit in the code word decides on the class to which the image region is to be allocated.

In the shown exemplary embodiment, the feature map has the largest value, namely 0.9. at digit 3 so that the image information is to be allocated to class 3. It is understood that specific object classes can be allocated to the respective feature maps, for example "pedestrian", "cyclist", "motor vehicle" etc., so that an object can be specified via the classification.

The problem with the one-hot encoding method is that the number of feature maps increases linearly with the number of classes. This is disadvantageous for the required computational and storage resources. In particular, during the implementation of neural networks in vehicles, the hardware on which the neural network is implemented is very limited.

Figure 3:
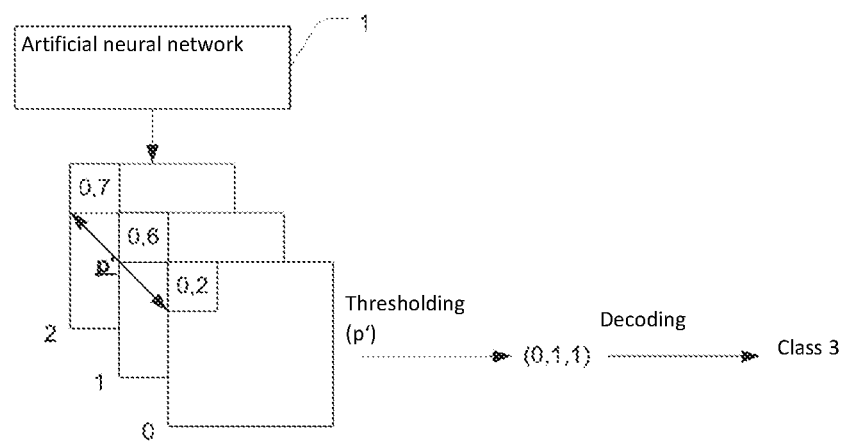
FIG. 3 shows by way of example a schematic representation of the output information of the neural network in the form of multiple feature maps involving the application of the suggested binary coding method.

FIG. 3 shows by way of example and schematically an artificial neural network 1 which outputs class information in a binary-coded form as output information. The inputs corresponding to one another in the feature maps, here having the values (0.2, 0.6, 0.7), form a quasi-binary-coded code word. The values contained in the feature maps are distorted by estimation inaccuracies or by noise. They can be converted into a binary-coded code word by a comparison with a threshold. The threshold operation can be:

$$\hat{p}_i = \begin{cases} 1 & \text{if } p_i \geq t \\ 0 & \text{else} \end{cases} \quad \text{(Formula 1)}$$

wherein $\hat{p}$ is a binary number which forms one digit of the binary code word, $p_i$ is the respective value of the input in the feature map, which corresponds to the digit of the binary code word (i.e., the value distorted by estimation errors), and t is the decision threshold.

The threshold t can be 0.5, for example. This therefore produces a binary code word of (0, 1, 1).

By decoding the binary code word (0, 1, 1), the class can then be established, namely class 3.

The result of the binary coding of the output information of the neural network 1 is that the number of feature maps output is smaller than the number of classes. In particular, a reduction in the number of feature maps from N to log 2(N) is achieved by the binary coding, wherein N is the number of classes of the classification task. The compression factor, compared with one-hot encoding, is $$\frac{N}{\log_2(N)}.$$

It is obvious that the compression factor increases with the number of classes N, i.e., the suggested method saves computational resources all the more, the greater the number N of classes is.

As previously explained, the suggested method can also be utilized during the solution of regression tasks, in which continual output variables are allocated to image regions of the image information.

A regression problem can be converted into a classification problem in that a number of feature maps is output as output information of the neural network, which number corresponds to the number of quantization steps. If, for example, a range of values of an output variable is divided into 1024 quantization steps, 1024 feature maps would be output as output information of the neural network, if the suggested method were not applied.

In order to reduce the number of feature maps, the output information of the neural network is provided in a binary-coded form, wherein the quasi-binary code word (before the aforementioned threshold operation) or the binary code word (after the aforementioned threshold operation) represents a quantization step, from which an output variable in the form of a real number can be derived.

If, for example, a real number in the range between 0 and 1 is output as the output information, it is not the real number itself, but a binary-coded quantization step which is output, which corresponds to the real number.

If, for example, a binary code word [1011010011] is output by the neural network (i.e., after applying the threshold operation), the quantization step y is first derived from said binary code word. This can be effected by the following formula:

$$y = \sum_{i=0}^{n-1} 2^i * x_i \quad \text{(Formula 2)}$$

wherein n is the length of the binary code word and xi is the value at the digit of the binary code word and i=0 designates the least significant bit.

The binary code word [1011010011] produces one quantization step of 723. During 1024 quantization steps in total, a value rounded to two decimal places of 0.71 is produced for the range of values between 0 and 1 as a real output variable.

Therefore, the disclosed method for processing image information can also be applied to regression problems.

The method for training the neural network 1 to enable it to output coded output information in the form of binary or substantially binary code words in feature maps is described below based on FIG. 4.

It is essential that a learning database (also designated ground truth), which comprises feature maps having nominal code words regarding said image information, is available for image information which is used for training the neural network 1. Thus, nominal classifications for image regions or pixels of the image information (designated target values in FIG. 4) are predefined for example for image information, which reproduces a traffic situation in the surrounding area of the vehicle, and these are output in feature maps following binary coding of the class information. The fields corresponding to one another in the feature maps always refer, for example, to the same image region. Thus, the digital value "0" can refer to a specific pixel or a defined image region of the image information, for example in the upper left field of the first feature map.

The neural network 1 is trained in such a way that the image information, regarding which a learning database is available, is delivered to the neural network as input information in order to carry out a classification estimation, for example.

Figure 4:
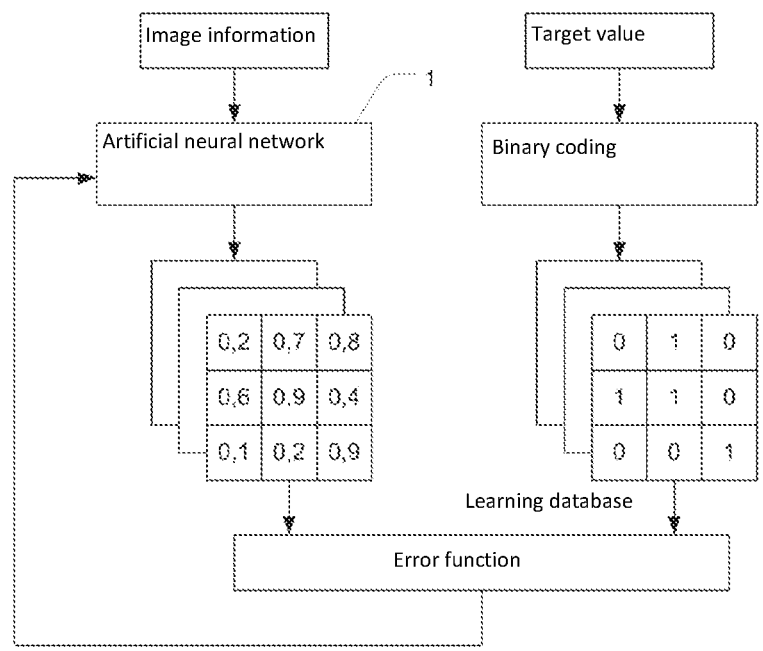
FIG. 4 shows by way of example a schematic representation for training the neural network.

As can be seen in FIG. 4, estimation errors produce a deviation between the values of the feature maps which are output by the neural network 1 and the values of the feature maps of the learning database.

An error function, based on the result of which the estimation error is minimized, for example based on a gradient method, and the weights of the neural network 1 are adapted, is used for training the neural network.

During a classification task, error functions can be used, which can handle assignments to multiple classes, i.e., those which simultaneously make possible an optimization of the classification results for multiple classes (also designated "multi-label classification"). Examples of such error functions are binary cross entropy or focal losses. The values of the feature maps output by the neural network can, for example, be modified via a limiting function, in particular a sigmoid function, and can then be supplied to the error function. The limiting function can result in the values of the feature maps estimated by the neural network 1 lying between 0 and 1.

An example of a binary cross entropy function is:

$$E = \frac{1}{\log_2(N)} \sum_{i=0}^{\log_2(N)-1} w_i(-y_i \cdot \log(\hat{p}_i) - (1-y_i) \cdot \log(1-\hat{p}_i))$$ (Formula 3)

$$\text{wherein } w_i = \begin{cases} 1, & \text{classification} \\ \frac{1}{2^{\log_2(N)-1-i}}, & \text{regression} \end{cases}$$

and wherein E indicates the classification error, N is the number of classes, $\hat{p}_i$ is the respective estimated output value, $w_i$ is a weighting factor and $y_i$ is the nominal value according to the training data. i forms the control variable, wherein i=0 designates the least significant bit.

Based on the classification error of the error function, the weightings of the neural network can be adapted, for example, via a backpropagation algorithm.

Another possible way of determining the error involves decoding the binary code word into a real number or a decimal number prior to applying the error function, i.e., the estimated code word is not compared with the binary nominal code word, but an estimated value obtained by decoding in the form of a real or decimal number is compared with a nominal value likewise in the form of a real or decimal number. As a result, further error functions can be applied, for example error functions which indicate the absolute error such as, for example:

$$E = |y - p|$$ (Formula 4)

wherein E indicates the classification error, p is the respective estimated output value and y is the nominal value according to the training data.

Generally speaking, the following thus applies:

$$\hat{E}(y, p) = E(D(y), D(p))$$ (Formula 5)

wherein $\hat{E}(y,p)$ indicates the classification error, E is an error function and D(y) and D(p) are functions for decoding the code word estimated by the neural network or the binary nominal code word of the training data.

The decoding of the estimated code word or of the binary nominal code word of the training data into a real or decimal number can be effected based on the following formula:

$$D = \frac{1}{N-1} \sum_{i=0}^{\log_2(N)-1} 2^i \cdot x_i;$$ (Formula 6)

wherein N is the number of quantization steps and xi is the respective value at the digits of the estimated code word or of the binary nominal code word of the training data.

The following example is intended to illustrate the advantage of applying the error function following the decoding of the code words.

If it is assumed that the code word estimated by the neural network, following the application of the threshold operation according to Formula 1 is, for example (0111111111), i.e., corresponds to 511 as a decimal number, but the nominal code word according to the training data is (1000000000), i.e., corresponds to 512 as a decimal number, the binary distance of the code words would not correspond to the actual distance of the decoded numbers, as it is relevant for the training of a neural network for regression tasks. It is therefore advantageous, especially for regression tasks, to embed the decoding in the error function, as shown by formula 5, i.e., the error estimation is carried out after the decoding.

The invention has been described above with reference to exemplary embodiments. It is understood that numerous amendments and variations are possible, without departing from the scope of protection defined by the claims.

The invention claimed is:

1. A method for processing image information of an imaging sensor of a vehicle in an artificial neural network which includes at least one encoder and one decoder, wherein the artificial neural network solves at least one of a classification task with a plurality of classes or a regression task in which numerical output information quantized according to a plurality of quantization steps is provided, wherein the artificial neural network outputs multiple feature maps at an output interface of the artificial neural network for performing a driving assistance function, wherein allocations of image regions of the image information to classes or numerical output information quantized regarding the image information are output by the feature maps in an encoded manner such that respective inputs in corresponding matrix fields of the feature maps together produce a code word and wherein an information compression is achieved by the encoding, wherein an output number of feature maps is smaller than a number of classes or a number of quantization steps, wherein the inputs of the feature maps which form the code word are distorted by estimation errors and are converted by a decision function into a binary-coded code word, wherein the following decision function is used:

$$\hat{p} = \begin{cases} 1; \text{if } p_i \geq t \\ 0; \text{else} \end{cases}$$

wherein $\hat{p}_i$ is a binary number which forms one digit of the binary-coded code word, p is the respective value of the input in the feature map, which corresponds to the digit of the binary-coded code word, and t is a decision threshold.

2. The method according to claim 1, wherein the binary-coded code word is decoded into class information or a rational number.

3. The method according to claim 1, wherein the classification task is a semantic segmentation task and/or the regression task is a task for monocular depth estimation.

4. The method according to claim 1, wherein the encoder is a multi-task encoder which provides computing operations for a classification task and a regression task.

5. The method according to claim 1, wherein the decoder is a multi-task decoder which provides computing operations for the at least one of the classification task or the regression task.

6. The method according to claim 1, wherein the artificial neural network is trained based on an error function which determines a total distance of the values of digits of the code word estimated by the neural network from respective values of corresponding digits of a nominal code word of training data for training the artificial neural network.

7. The method according to claim 6, wherein the values of the digits of the code word estimated by the neural network are adapted with a limiting function prior to application of the error function.

8. The method according to claim 7, wherein the limiting function is a sigmoid function.

9. The method according to claim 1, wherein the artificial neural network is trained based on at least one of a binary cross entropy error function or a focal loss error function.

10. The method according to claim 9, wherein the values of digits of the code word estimated by the neural network are adapted with a limiting function prior to application of the error function.

11. The method according to claim 10, wherein the limiting function is a sigmoid function.

12. The method according to claim 1, wherein prior to application of an error function, the code word is decoded into a rational number and the error function determines the distance of the decoded rational number from the nominal value according to the training data.

13. A system for processing image information of an imaging sensor of a vehicle in an artificial neural network which comprises at least one encoder and at least one decoder, wherein the artificial neural network is designed to solve at least one of a classification task with a plurality of classes or a regression task, in which numerical output information quantized according to a plurality of quantization steps is provided, wherein the artificial neural network is configured to output multiple feature maps at an output interface of the artificial neural network to perform a driving assistance function, allocations of image regions of the image information to classes or numerical output information quantized regarding the image information is/are output by the feature maps in an encoded manner, such that respective inputs in corresponding matrix fields of the feature maps together produce a code word, wherein an information compression is achieved by the encoding, and such that an output number of feature maps is smaller than a number of classes or a number of quantization steps, wherein the artificial neural network is trained based on an error function, and wherein the values of digits of the code word estimated by the neural network are adapted with a limiting function prior to application of the error function.

14. The system according to claim 13, wherein the imaging sensor is at least one of a camera, a radar, and a lidar sensor of a vehicle.

15. The system according to claim 13, wherein the encoder is a multi-task encoder which provides computing operations for the classification task and the regression task, wherein the classification task is a semantic segmentation task and the regression task is a task for monocular depth estimation.

16. The system according to claim 13, wherein the inputs of the feature maps which form the code word are distorted by estimation errors and are converted by a decision function into a binary-coded code word, and wherein the following decision function is used:

$$\hat{p} = \begin{cases} 1; \text{if } p_i \geq t \\ 0; \text{else} \end{cases}$$

wherein $\hat{p}_i$ is a binary number which forms one digit of the binary-coded code word, $p_i$ is the respective value of the input in the feature map, which corresponds to the digit of the binary-coded code word, and t is a decision threshold.

17. The system according to claim 13, wherein the error function determines a total distance of the values of the digits of the code word estimated by the neural network from respective values of corresponding digits of a nominal code word of training data for training the artificial neural network.

18. The system according to claim 13, wherein the limiting function is a sigmoid function.

19. The system according to claim 13, wherein the error function comprises at least one of a binary cross entropy error function or a focal loss error function.

20. The method according to claim 1, wherein the at least one of the classification task or the regression task contains the information compression.

* * * * *